Nov. 13, 1956 W. H. JENSEN 2,770,182
ELECTRIC MEAT FRYER
Filed July 2, 1954 2 Sheets-Sheet 2
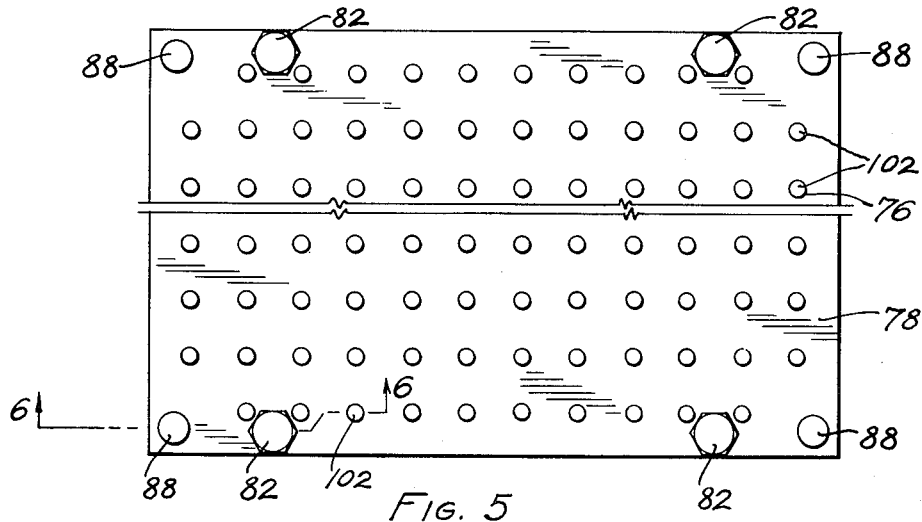
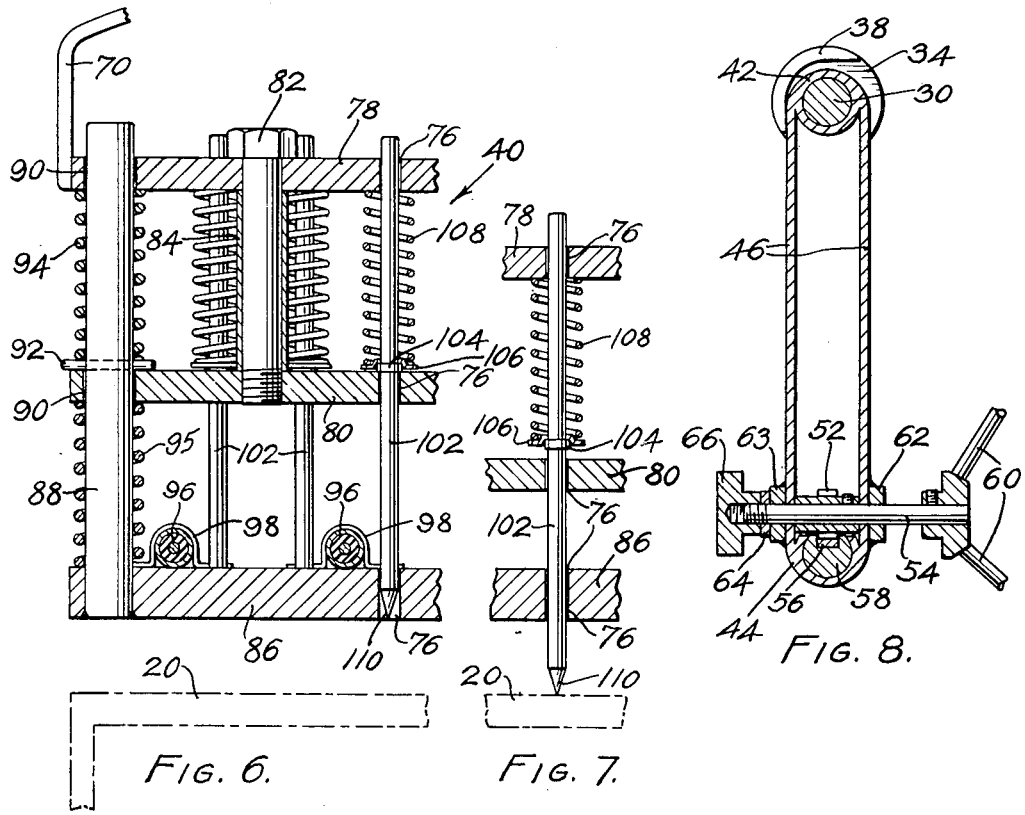
INVENTOR.
WELDON H. JENSEN
BY
Martin E. Anderson
ATTORNEY United States Patent Office 2,770,182
Patented Nov. 13, 1956

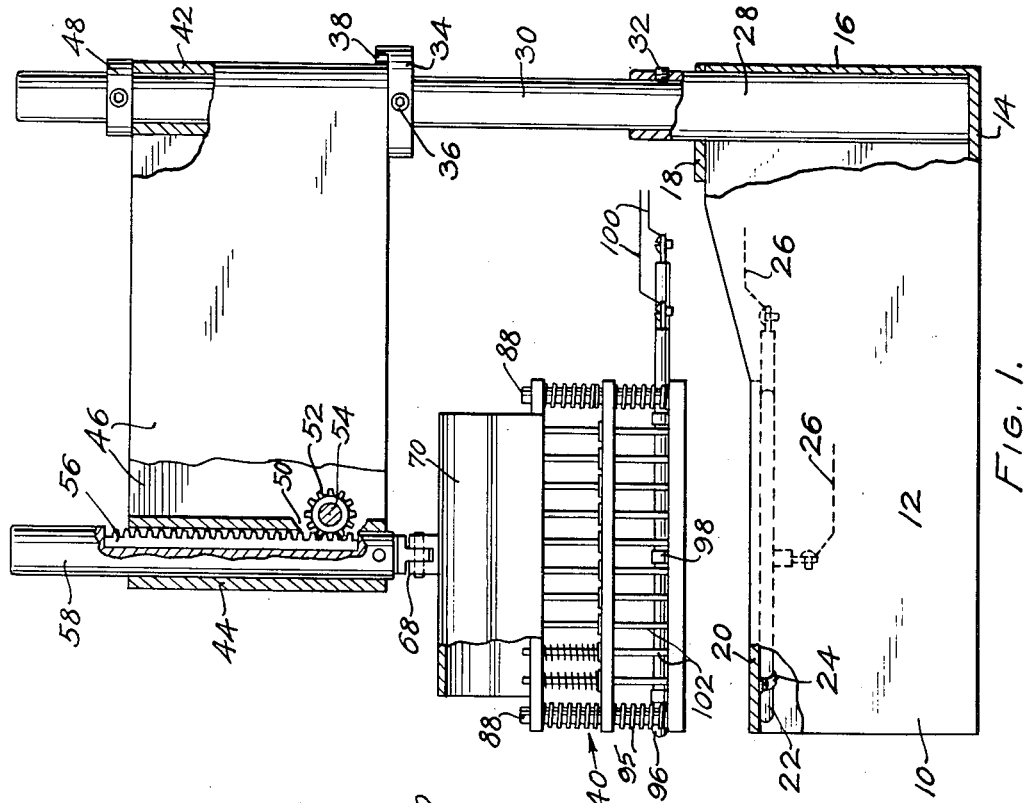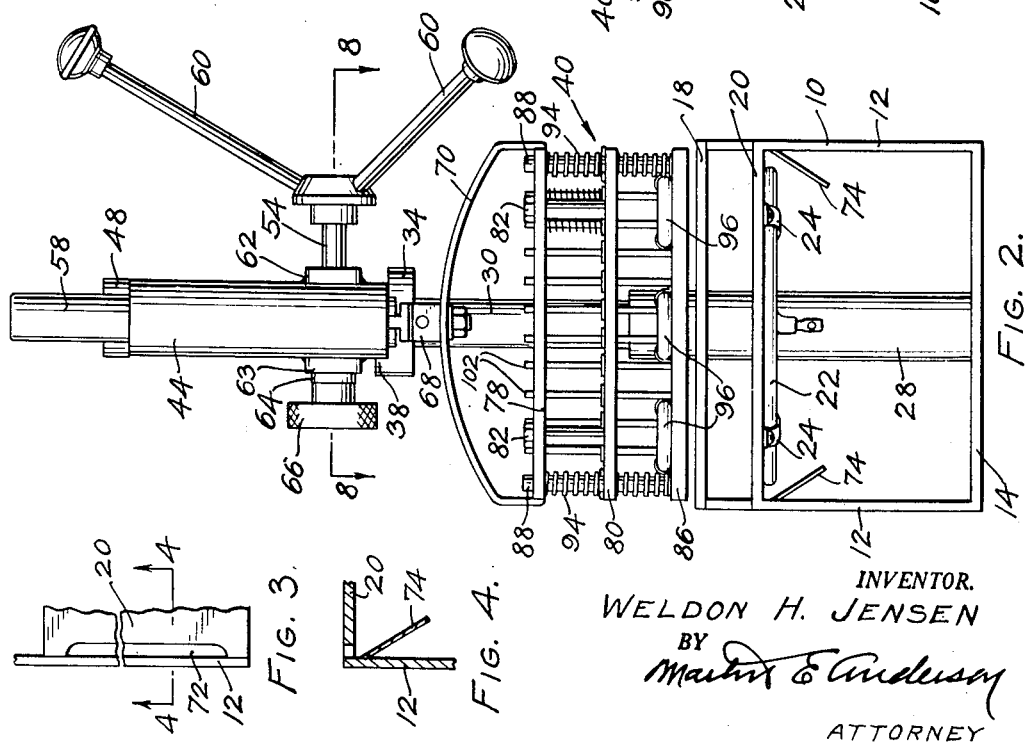

2,770,182
ELECTRIC MEAT FRYER

Weldon H. Jensen, Salt Lake City, Utah, assignor of one-half to William B. Lynch, Cheyenne, Wyo.

Application July 2, 1954, Serial No. 441,044

10 Claims. (Cl. 99—373)

This invention relates to fryers, and more particularly, to electric meat fryers.

A problem of considerable importance which has long faced restaurants and other eating establishments is the loss in weight of certain meats caused by frying them. This problem becomes increasingly significant from the economic standpoint as the number of fried meat servings increase; and also, as meat prices soar. Fried meat frequently loses as much as 43% of its weight in juices before and after frying by conventional methods. It can easily be seen that a restaurant serving several hundred pounds of fried meat a day could effect a considerable saving if this weight loss could be reduced. Furthermore, most of the fine flavor and taste of steaks and other meat products is directly attributable to the juices they contain. As these juices are lost in frying the meat tends to become dry and tasteless.

By virtue of the present invention it is possible to fry meat with only a 3% loss in weight thus eliminating the above problem to a large extent. Furthermore, it is possible to fry the average steak in only thirty-six seconds with the meat fryer described herein. This, of course, produces fried meats which are juicy and tender containing nearly all their original juices. The rapidity with which the fryer is able to cook steaks and the like enables even large restaurants to keep up with all their orders for fried meat with only one unit. Of greatest importance, however, is the fact that the restaurant need only buy slightly over half their normal purchases of meat while continuing to supply the same size order; or conversely, they may purchase the same amount and give their customers servings almost twice as large.

The meat fryer of the present invention is also supplied with a novel stripping device by which the cooked steak is automatically removed from the pins which are forced into the body of the meat and cause it to be cooked so rapidly.

The principal object of the present invention is, therefore, the provision of a meat fryer which will cook meat so rapidly that nearly all the juices and flavor are retained.

A second object of the invention is to provide a novel stripping device for automatically removing the heated pins from the cooked meat.

A further object of the invention is the provision of a steak fryer which is relatively small, compact, decorative in appearance, and simple to operate and clean.

Other objects will be in part apparent and in part pointed out specifically hereinafter in connection with the description of the drawing which follows; and in which, Figure 1 is a side elevation of the meat fryer of the present invention in its entirety with portions thereof broken away to better show the construction;

Figure 2 is a front elevation;

Figure 3 is a fragmentary view looking downward on the stationary plate showing the grease slot therein;

Figure 4 is a transverse section taken along line 4—4 of Figure 3;

Figure 5 is a top plan view of the upper plate, portions of which have been broken away to conserve space;

Figure 6 is a transverse section taken along line 6—6 of Figure 5 showing the heating and stripping assembly in detail;

Figure 7 is a detailed view showing the construction and operation of the pin; and, Figure 8 is a transverse section taken along line 8—8 of Figure 2 showing the construction of the mechanism for raising, lowering, and pivoting the stripping and heating assembly.

Referring now in particular to Figures 1 and 2 of the drawing, reference numeral 10 designates a base having side walls 12, a bottom wall 14, a rear wall 16, and a top wall 18. A portion of the base at the forward end is covered by stationary plate 20 on the underside of which is fastened heating element 22 by means of brackets 24. The heating element is connected to a source of electrical energy by conductors 26. Heating element 22 is preferably spiral shaped in order that heater plate 22 may be heated evenly. The conventional Cal-rod electric heating unit has been found quite satisfactory, however, a number of other well known types of electric resistance heating units such as those used on electric stoves will function as well for the purposes of the present invention. A short section of pipe 28 is welded or otherwise permanently attached in vertical position at the rear portion of the base. Rod 30 is fastened inside pipe 28 by set screw 32 in position to rise vertically above the base. Stop collar 34 is fastened to the rod by means of set screw 36 at a point spaced above the base. The upper face of the stop collar is provided wtih a stop cam 38, shown most clearly in Figure 8, and which will be described in detail in connection therewith.

The upper movable heating and stripping assembly designated in general by numeral 40 is supported for lateral swinging movement by an arm mounted for pivotation on rod 30 and stop collar 34 said means comprising an arm having spaced pipes 42 and 44 joined together by spaced side plates 46. Pipe 42 is mounted for free rotation on rod 30 and is held in place by upper set collar 48. Pipe 44 is provided with pinion gear opening 50 positioned to receive the teeth of pinion gear 52 attached to shaft 54 journaled in bearings 62 and 63 mounted on the outside of side plates 46. Rack 56 meshes with pinion 52 and is permanently attached to adjustment rod 58 which is mounted for slidable movement in pipe 44. Operating handles 60 are rigidly connected to the end of shaft 54 and provide means for rotating the shaft and attached pinion to raise and lower the adjustment rod within pipe 44. Collar 64 is mounted for free rotation on shaft 54 adjacent one of the side plates between it and knurled knob 66 which is threadedly attached to the end of shaft 54. This construction will be described in further detail in connection with Figure 8.

Universal joint 68 is attached to the lower end of adjustment rod 58 and the top center of cover plate 70. Heating and stripping assembly 40 is supported from the cover plate and may be tilted with respect to stationary plate 20 by virtue of the universal joint 68. The heating and stripping assembly may be lowered onto the stationary plate by operation of the rack and pinion. The details of construction of the heating and stripping assembly will be described in connection with Figures 5, 6 and 7 hereof.

Figure 3 illustrates a portion of stationary plate 20 lying adjacent side wall 12 which contained a grease slot 72 to permit the grease and what little juices are lost from the meat to drain from the surface of the stationary heater plate.

Figure 4 shows the manner in which the grease passing through grease slot 72 will drain onto splash plate 74 fastened to side walls 12 beneath the grease slot. A suitable pan, not shown, is laid on bottom wall 14 in position to catch the grease running off the splash plate.

Referring now in particular to Figures 5, 6 and 7 wherein the heating and stripping assembly is illustrated in detail, it will be seen to comprise three flat plates held in spaced parallel relation and provided with a plurality of aligned pin openings 76. The upper plate 78, shown in top plan view of Figure 5, is permanently attached along opposite side edges to cover plate 70. Middle plate 80 is held in spaced parallel relation beneath upper plate 78 by bolts 82 and sleeves 84 shown only in Figure 6. A lower or stripping plate 86 is provided with at least 4 guide rods 88 rigidly connected thereto and rising vertically parallel to one another from the four corners of the plate. These guide rods are slidable within corresponding aligned guide rod openings 90 in the middle and upper plates. The stripping plate is supported by cotter pins 92 which pass through the guide rod and lie on the upper face of middle plate 80. The stripping plate is held in spaced parallel relation beneath middle plate 80 by compression springs 94 supported between the cotter pins and the under surface of upper plate 78 and compression springs 95 between adjacent faces of the middle and stripping plates. Therefore, when the heating and stripping assembly is moved downward onto the top of a piece of meat lying on stationary plate 20, stripping plate 86 will remain on the surface of the meat while upper and middle plates 78 and 80 may be lowered further compressing compression springs 94 and 95 and closing the space between the stripping plate and middle plate, as shown quite clearly in Figure 7. Heating element 96 is secured to the upper surface of stripping plate 86 by suitable brackets 98. The heating element is connected to a source of electric current by conductors 100, shown in Figure 1. Three separate U-shaped heating elements wired in parallel have been illustrated in Figures 1 and 2 as the source of heat for the stripping plate; however, a number of other heating unit shapes might be used which would provide an even heat for the plate.

Figure 7 shows the construction and operation of the pins 102 which slide in each of the aligned pin openings 76 in the three spaced parallel plates of the heating and stripping assembly. Each of the pins is supported by middle plate 80 on annular flange 104. A washer 106 is supported on the upper surface of the annular flange and a compression spring 108 between the washer and the under surface of the upper plate 78 acts to force each of the pins downward. Each of the pins is provided with a pointed lower end 110 which is approximately flush with the under surface of the stripping plate when the stripping plate is in position with the cotter pin bearing against the top surface of middle plate 80. As the stripping plate is forced upward relative to the middle and upper plate by a piece of meat lying on the stationary plate 20 as here-in-above described, the pins will move on through the pin openings in the stripping plate and pierce the meat. If, however, one or more of the pins come into contact with a bone or other obstruction they will yield to such obstruction and move upward relative to the three plates compressing compression spring 108. The remaining pins will, of course, pierce the meat as the heating and stripping assembly is lowered until the points of the pin contact the surface of plate 20. The pins within the piece of meat transfer the heat from heating element 96 directly to the interior of the meat and enable it to be cooked very rapidly. Additional heat is supplied by conduction through stripping plate 86. The under side of the meat is cooked by conduction from heating element 22 through stationary plate 20. Universal joint 68 enables the entire heating and stripping assembly to tilt so that it will more nearly conform to the surface of the meat. After the meat has been cooked to the desired point the heating and stripping unit is raised by the operating handle and the action of compression springs 94 and 95 force stripping plate 86 downward to the position shown in Figure 6 and the meat is stripped off the pins. Were it not for this stripping action the meat would remain on the pins and be very difficult to remove.

In connection with Figure 8 will be seen the manner in which stop cam 38 on the upper face of stop collar 34 acts against one of the side plates 46 to stop the heating and stripping assembly in position directly above stationary plate 20. After the meat has been cooked the heating and stripping assembly may be pivoted out of the way to permit the steak to be taken off the fryer. It is also useful in cleaning and greasing the fryer. Knurled knob 66 is threadedly connected to the end of shaft 54 and holds the shaft and cooperating rack and pinion in fixed position by forcing movable collar 64 against bushing 63 which in turn draws the hub of pinion 52 into frictional contact with side plate 46. The knob is released when it is desired to move the heating and stripping assembly.

Having thus described the many useful and novel features of the present invention in connection with the accompanying drawing, it will be seen that the many useful objects for which it was constructed have been achieved; and therefore,

I claim:

1. An electric meat fryer comprising a substantially horizontal stationary plate, at least one movable plate positioned above the stationary plate and mounted for upward and downward movement relative thereto, a stripping plate suspended beneath the movable plate for upward and downward movement relative thereto, spring means urging the stripping plate downward, said stripping and movable plates having a plurality of aligned pin openings therein, a plurality of pins mounted for upward and downward movement through said pin openings, said pins normally extending below the movable plate with their lower ends positioned above the underside of the stripping plate, spring means urging the pins downward, and electric heating elements connected to a source of electrical energy and positioned to heat the stripping and stationary plates.

2. A device in accordance with claim 1 in which an upper movable plate and a middle movable plate rigidly connected together in spaced substantially parallel relation are mounted for upward and downward movement relative to the stationary plate; and in which, compression springs operatively associated with each of the pins and acting against the upper movable plate are used to urge said pins downward.

3. A device in accordance with claim 1 in which an upper movable plate and a middle movable plate rigidly connected together in spaced substantially parallel relation are mounted for upward and downward movement relative to the stationary plate; and in which, compression springs operatively associated with the stripping plate and acting against at least one of the movable plates are used to urge said stripping plate downward.

4. A device in accordance with claim 1 in which means comprising stops are operatively associated with each of the pins and the stripping plate to limit the downward movement thereof.

5. A device in accordance with claim 1 in which three spaced substantially parallel plates are connected together and mounted for upward and downward movement relative to the stationary plate, the upper and middle plates being rigidly attached to one another and the lower or stripping plate being suspended below the upper and middle plates and mounted for upward and downward movement relative thereto.

6. A device in accordance with claim 2 in which compression springs operatively associated with the stripping plate and acting against at least one of the movable plates are provided for urging said stripping plate downward; and in which, means comprising stops are operatively associated with each of the pins and the stripping plate to limit the downward movement thereof.

7. A device in accordance with claim 5 in which compression springs are operatively connected to each of the pins and act against the underside of the upper movable plate to urge the pins downward, compression springs are operatively connected to the stripping plate and act against the undersides of the upper and middle movable plates to urge said stripping plate downward, stop means are operatively connected to each of the pins and the stripping plate to limit the downward movement thereof, and the pin openings are aligned so that the pins move within said openings substantially at right angles to the surfaces of the plates.

8. A device in accordance with claim 7 in which a base supports the stationary plate, a frame is attached to the base and supports the three spaced parallel plates above the stationary plate, means comprising a rack and pinion operatively interconnect the spaced parallel plates and the frame for moving said plates upward and downward relative to the stationary plate, and a universal joint operatively interconnects the spaced parallel plates and the rack for universal tiltable movement of said plates relative to the stationary plate.

9. A device in accordance with claim 8 in which the frame is provided with means for pivoting the spaced parallel plates in a horizontal plane relative to the stationary plate.

10. An electric meat fryer comprising in combination, a base, an electrically heated plate supported thereby in substantially horizontal position, a rod projecting vertically from the base at a point spaced from the adjacent edge of said plate, an arm supported for lateral swinging movement by said rod, the free end of said arm extending over said plate, an upper heating and meat penetrating assembly suspended from the free end of said arm by means permitting a universal rocking movement, means comprising said arm for raising and lowering said assembly relative to said electrically heated plate, said heating and meat penetrating assembly comprising three vertically spaced substantially parallel plates, the top plate being operatively connected with the raising and lowering means, means securing the intermediate plate to the top plate in a fixed spaced relation thereto, the lower plate having a plurality of guide rods rigidly connected thereto which extend upwardly through corresponding guide openings in the intermediate and the top plate, each of said guide rods having a helical compression spring encircling the portions above and below the intermediate plate, a cotter pin or the like, operatively associated with each guide rod in the space between the top surface of the intermediate plate and the lower end of the upper spring, the three plates having a plurality of aligned openings, a meat piercing pin positioned in each set of aligned openings each pin having a collar positioned above the intermediate plate forming a stop limiting the downward movement of the pin, and a helical compression spring surrounding that portion of the pin between the top and the intermediate plates, the lower ends of the springs being supported by the collars, the lower end of the pins being pointed, and electric heater elements operatively associated with said lower plate which serves both as a heater and a stripping plate.

References Cited in the file of this patent
UNITED STATES PATENTS

| 1,206,093 | Chapman | Nov. 28, 1916 |
| 1,310,990 | Hauge et al. | July 22, 1919 |
| 1,915,962 | Vaughn | June 27, 1933 |
| 1,929,166 | Freemon | Oct. 3, 1933 |
| 1,987,349 | Rasmussen | Jan. 8, 1935 |
| 2,401,991 | Walton et al. | June 11, 1946 |
| 2,466,772 | Kenyon | Apr. 12, 1949 |
| 2,522,175 | Hill | Sept. 12, 1950 |